March 17, 1931. J. DE LA CIERVA Re. 18,002

AIRCRAFT HAVING ROTATIVE WINGS

Original Filed March 26, 1927

INVENTOR.
Juan de la Cierva
BY
Synnestvedt & Lechner
ATTORNEYS.

Reissued Mar. 17, 1931

Re. 18,002

UNITED STATES PATENT OFFICE

JUAN DE LA CIERVA, OF MADRID, SPAIN, ASSIGNOR TO PITCAIRN CIERVA AUTOGIRO COMPANY OF AMERICA, A CORPORATION OF DELAWARE

AIRCRAFT HAVING ROTATIVE WINGS

Original No. 1,682,894, dated September 4, 1928, Serial No. 178,708, filed March 26, 1927, and in Great Britain April 7, 1926. Application for reissue filed August 16, 1930. Serial No. 475,795.

This invention relates to aircraft having rotative wings and particularly to under-carriages or landing gear for aircraft of the type embodying a freely rotative hinged-wing system such as that described in my patent specification No. 1,590,497.

In order to prevent damage to the articulated wing structure by sudden strong gusts of wind it is desirable that the angle of incidence of the wings in a machine of this character should be as nearly as possible zero when the aircraft is stationary on the ground. It is necessary on the other hand that the wings should have a relatively great positive incidence when taking off, and my present invention aims at providing an under-carriage for aircraft of this character such that the air-craft has two positions of rest, the one in which the incidence of the lifting surfaces is approximately zero to enable the machine to stand with little or no danger, and the other in which the incidence is sufficiently positive to enable the machine to take off.

Primarily, according to the present invention, I provide an under-carriage, for aircraft of the character referred to, in which the landing elements proper, such as wheels or wheels and skids are so disposed with relation to the center of gravity of the air-craft that the latter when at rest possesses two positions of equilibrium, one in which the longitudinal axis of the aircraft is substantially horizontal and the angle of incidence of the wings approximately zero, and the other in which the tail-skid or other rearmost landing element is in contact with the ground or other surface and the angle of incidence of the wings is positive.

For this purpose the under-carriage may embody a pair or more of principal landing wheels so disposed that their axles lie in rear of the vertical plane thru the center of gravity of the aircraft when the latter is resting with its longitudinal axis substantially horizontal, and in advance of said vertical plane when the tail-skid or other rearmost landing element is in contact with the ground, and a wheel or wheels in advance of the principal wheel or wheels to support the aircraft in the first mentioned stationary position of equilibrium.

To enable the aircraft to be readily moved from one position of equilibrium to the other the displacement of the axles of the principal landing wheels from the vertical plane through the center of gravity of the aircraft may be relatively small so that the pilot by raising or lowering the elevator or controllable tail plane, may cause the slip stream from the propeller or propellers to rock the aircraft from one of the said positions to the other.

To support the aircraft in its substantially horizontal position of zero incidence either forwardly disposed landing wheels or skids may be employed. In an amphibian aircraft the principal wheels and the forward wheels or skids may be mounted in or upon the floats in the case of seaplanes or the hull in the case of flying boats, and since the forward landing speed is small it may be unnecessary to provide means for withdrawing the wheels or skids into the floats or the hull, for landing upon water.

A further feature of the present invention consists in mounting the skids, or floats in the case of seaplanes, in such a manner that they are permitted a restricted pivotal movement about vertical axes, with suitable centralizing springs or other devices acting to maintain said skids or floats normally parallel to the fuselage but allowing them, when the aircraft lands with a lateral speed, to set themselves in the direction of the resultant speed. To accomplish this the vertical axes of rotation of the skids or floats should obviously be in advance of the center of friction with the surface landed upon, in order to keep the landing elements steady during sliding.

The present invention is diagrammatically illustrated in the accompanying drawings in which for the sake of clearness only the near side landing elements are shown.

Figure 4:
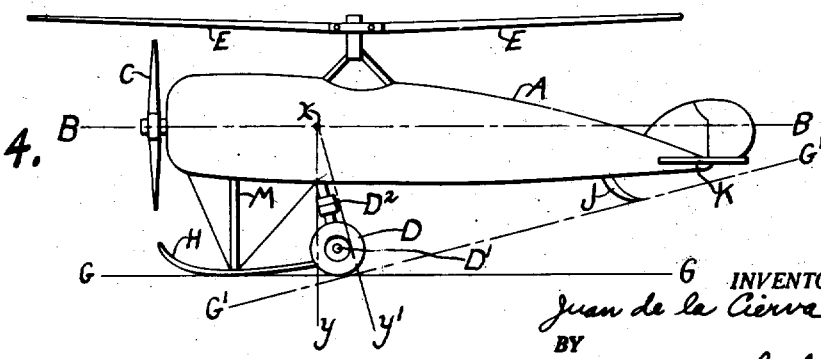

Fig. 4 diagrammatically illustrates an arrangement in which the landing elements are capable of restricted pivotal movement about vertical axes as aforesaid.

In all of these figures, A denotes the fuselage of the aircraft and B B the longitudinal axis, being the axis of thrust of the propeller C. The point $x$ represents the center of gravity of the aircraft and D denotes one of a pair or more of principal landing wheels secured to the fuselage through any convenient system of shock absorbers, diagrammatically indicated at $D^2$.

The line G G represents the horizontal surface upon which the aircraft rests in one position and $G^1$ $G^1$ the horizontal surface in the other position. The axles $D^1$ of the wheels D are so disposed with relation to the center of gravity $x$ of the aircraft that the vertical plane, represented by the line $x$ $y$, through the center of gravity $x$ is in advance of the axles $D^1$ when the aircraft is in substantially horizontal position, which is therefore a position of equilibrium. In this position the angle of incidence of the wings E is substantially zero. Although only forwardly and rearwardly extending wings of the rotative system are shown, it will be obvious that the incidence of laterally extending wings will be more nearly zero than when the aircraft is tilted back as hereafter mentioned.

Figure 1:
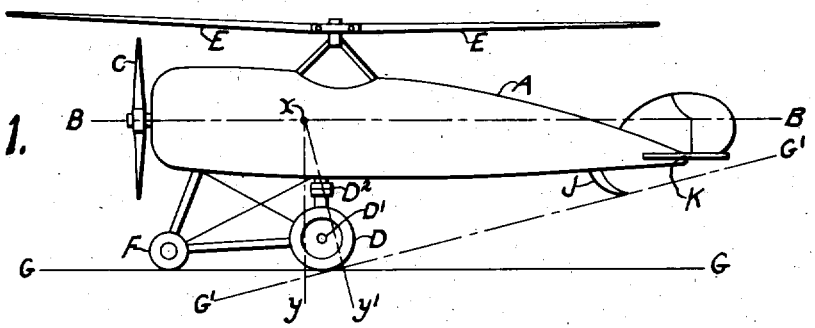
Fig. 1 is a side elevational view of an aircraft of the type referred to illustrating the employment of forward landing wheels in conjunction with the principal wheels.
Figure 2:
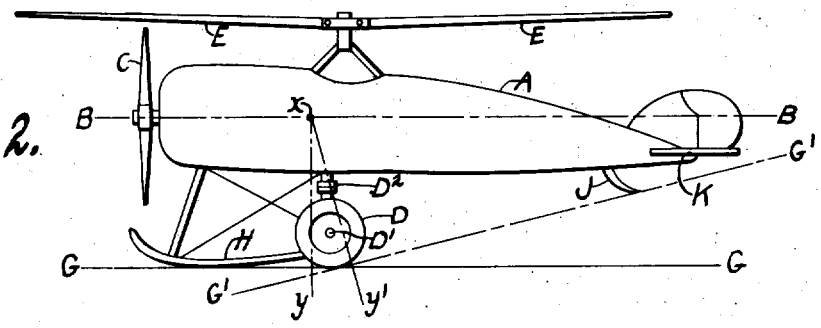
Fig. 2 is a similar view but showing the forward landing wheels replaced by skids.

In Fig. 1 a forwardly disposed wheel or wheels F is or are provided to maintain the substantially horizontal position of the aircraft and in Fig. 2 a skid or skids H are employed for this purpose, the skids being used as aforesaid only in cases where the forward landing speed is relatively very small.

The other position of equilibrium of the aircraft is that represented by the contact of the principal wheels D and a tail skid J with the surface represented by the line $G^1$ $G^1$, the aircraft having been rocked back about the axles $D^1$. In this position the vertical plane represented by the line $x$ $y^1$ through the center of gravity $x$ is behind the axles $D^1$ thereby ensuring the state of equilibrium in this position, in which the angle of incidence of the wings E is sufficiently positive to enable the aircraft to take off.

The displacement of the lines $x$ $y$ and $x$ $y^1$ from the wheel axles $D^1$ is preferably small, for instance such that the couple produced by the action of the slip stream from the propeller C upon the lifted or depressed elevator K is sufficient to rock the aircraft from one position to the other.

Figure 3:
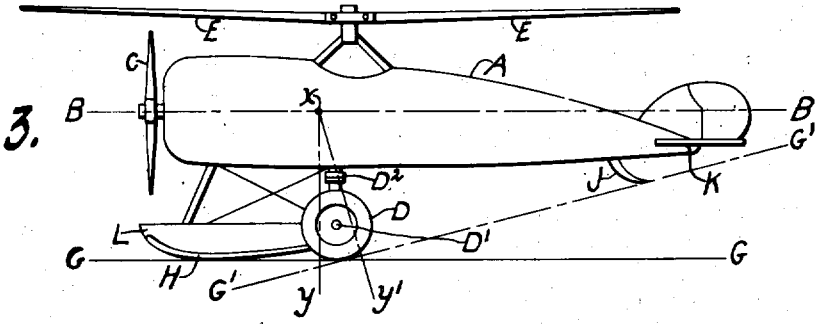
Fig. 3 shows an application of the invention to a seaplane.

In Fig. 3 the principal landing wheels D and skids H are mounted upon the floats L of a seaplane; the condition as to the relative positions of the axles $D^1$ and the center of gravity $x$ of the aircraft being the same as that above described.

Fig. 4 illustrates diagrammatically a construction in which each skid H together with its landing wheel D is mounted to permit a restricted pivotal movement about a vertical axis M which is in advance of the center of friction of the said landing elements with the surface landed upon. The landing elements are in this manner enabled to set themselves parallel to the line of the resultant speed whenever the aircraft lands with a lateral as well as a forward speed. Elastic elements (not shown) of any suitable type, e. g. springs, are provided to maintain the skids normally parallel to the longitudinal axis of the aircraft or the direction of flight.

This construction may be similarly applied to the form of construction shown in Fig. 1 where forward landing wheels are used.

What I claim is:—

1. An aircraft having sustaining means including aerofoil surfaces rotatably mounted for actuation by relative air-flow and having means permitting displacement thereof with respect to their mean rotative path, means for supporting the aircraft on the ground, and means whereby the general mean plane of rotation of the sustaining means may be set at different stable angles with respect to the ground with the craft at rest.

2. An aircraft having sustaining means including aerofoil surfaces rotatably mounted for actuation by relative air-flow and having means permitting displacement thereof with respect to their mean rotative path, means for supporting the aircraft on the ground, and means whereby the general mean plane of rotation of the sustaining means may be set at different stable angles with respect to the ground with the craft at rest, said supporting means including in its structure said last-mentioned means.

3. An aircraft including supporting blades mounted for rotation by relative air-flow and having means permitting displacement thereof with respect to their mean rotative path, means for supporting the craft at rest on the ground with the general mean plane of rotation of the blades substantially horizontally disposed with respect to the ground and means for supporting the craft at rest on the ground with the general mean plane of rotation of the blades angularly disposed with respect to the ground.

4. An aircraft comprising a fuselage and propelling means, a supporting system comprising freely rotative wings articulated to the axis of rotation and adapted to be revolved by the relative air flow during flight and an undercarriage comprising principal landing wheels having their axles disposed close to a transverse vertical plane passing through the center of gravity of the aircraft, advanced landing elements disposed in front of the principal landing wheels to support the aircraft in stationary equilibrium with its longitudinal axis substantially horizontal and the angle of incidence of the wing system approximately zero, and a rear landing element such as a tail-skid to support the aircraft in conjunction with the principal landing wheels in another stationary position of equilibrium in which the wing system has a relatively great positive angle of incidence.

5. An aircraft comprising a fuselage and propelling means, a supporting system comprising freely rotative wings articulated to the axis of rotation and adapted to be revolved by the relative airflow during flight and an undercarriage including principal landing wheels, supplementary supporting means pivotally mounted in front of the principal landing wheels, said landing wheels being so disposed that their axles lie in the rear of the vertical plane through the center of gravity of the aircraft when resting on the wheels and supplemental supporting means and the said wheels being in advance of said vertical plane when the tail-skid of the aircraft is in contact with the ground.

6. An aircraft having sustaining means including aerofoil surfaces rotatably mounted for actuation by relative air-flow and having means permitting displacement thereof with respect to their mean rotative path, means for supporting the aircraft on the ground, and means whereby the general mean plane of rotation of the sustaining means may be set at different fore-and-aft angular positions of stability with respect to the ground with the craft at rest.

7. An aircraft including supporting blades mounted for rotation by relative air-flow and having means permitting displacement thereof with respect to their mean rotative path, means for supporting the craft at rest on the ground with the general mean plane of rotation of the blades substantially horizontally disposed with respect to the ground and means for supporting the craft at rest on the ground with the general mean plane of rotation of the blades disposed at an upwardly and forwardly inclined angle with respect to the ground.

In testimony whereof I have hereunto signed my name.

JUAN DE LA CIERVA.